(No Model.)

H. W. GARY.
END GATE FOR WAGONS.

No. 350,734. Patented Oct. 12, 1886.

Witnesses:
W. A. Anderson,
O. N. Stiles,

Inventor:
Harrison W. Gary,
By Thomas G. Orwig, Att'y.

United States Patent Office.

HARRISON W. GARY, OF PLUM CREEK, NEBRASKA.

END-GATE FOR WAGONS.

SPECIFICATION forming part of Letters Patent No. 350,734, dated October 12, 1886.

Application filed February 16, 1886. Serial No. 192,144. (No model.)

*To all whom it may concern:*

Be it known that I, HARRISON W. GARY, a citizen of the United States of America, and a resident of Plum Creek, in the county of Dawson and State of Nebraska, have invented an Improved End-Gate for Wagons, of which the following is a specification.

My invention is designed to facilitate closing tightly and securely the end of a wagon-box, as required to carry small grain in bulk, or any other farm product or matter usually shoveled in and out of a wagon-box, and also to facilitate opening and unloading the contents from the box. I accomplish the objects contemplated by the construction and combination of an adjustable gate, jointed braces, and locking devices with the end of a wagon-box, as hereinafter set forth, in such a manner that when the gate is in a vertical position and locked it will close the end of the box and also brace it and prevent it from spreading, as required to maintain tight joints, and when it is turned down into a horizontal position it will be an extension of the floor of the box, and braced and supported as required, to be used as a shoveling-board upon which a person can stand and tread about while shoveling the contents from the box.

Figure 1:
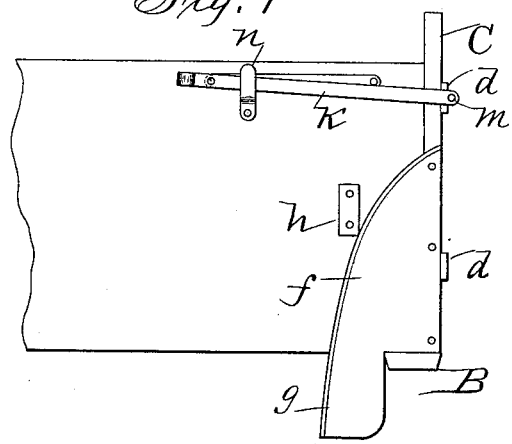
Figure 2:
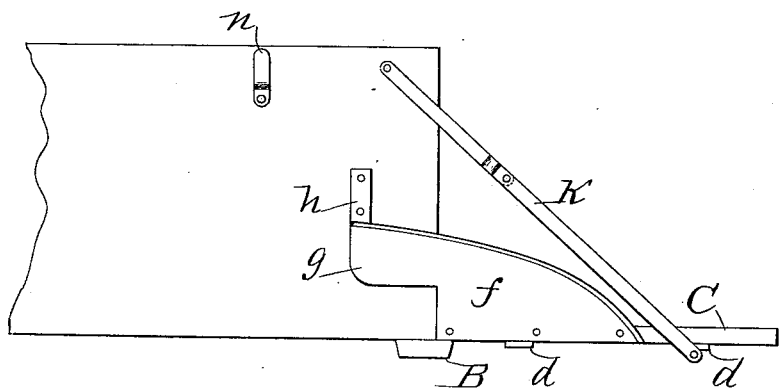

Figure 1 of the accompanying drawings is a side view showing the adjustable gate combined with the end of a wagon-box and locked in position, as required to close the end of the box. Fig. 2 shows the gate extended horizontally and supported in position, as required to be used as a shoveling-board.

A is one of the side-boards of a wagon-box.

B is a cleat fixed to the rear ends and the under edges of the sides A and also to the under side of the floor of the box by means of nails, screws, rivets, or in any suitable way, in such a manner that it will bind the sides and floor together and project laterally in opposite directions, and also rearward, to form a support for the end-gate, and, in combination with the bottom, a shoulder against which the square bottom of the gate will abut when in a vertical position, and also when in a horizontal position for the purpose of making a tight joint between the gate and the bottom of the box.

C is an end-gate, plain and solid, fitted to the open end of the box in such a manner that it will abut against the rear edges of the sides A when in a vertical position.

*d d* are cleats fixed across the rear face of the gate.

Triangular-shaped skirt-boards *f*, having extensions *g* at their corners, are fixed to the lower portions of the ends of the gate to project therefrom at right angles and forward, to overlap the outside faces of the sides A. When the gate is in a closed position, the extensions *g* will project below the sides and box, engage the projecting ends of the cleat B, and, in combination with said cleat, constitute a locking device that will retain the gate firmly fixed to the bottom portion of the box. When the gate is in a horizontal position, the extensions *g* will engage blocks or stops *h*, that are fixed against the sides A, to aid in retaining the gate level and secure while being used as a shoveling-board.

*k k* are jointed metal braces pivoted to the ends and top portions of the gate C, preferably by means of a rod, *m*, that extends across the rear side of the gate, and also pivoted near the tops and corners of the sides A in such a manner that they will double into parallel position, as shown in Fig. 1, when the gate is closed, and straighten and lengthen when the gate is in a horizontal position, as shown in Fig. 2.

Spring-clasps *n* are fixed against the sides A in such a manner that their free ends will extend upward to allow the doubled braces to be pressed under them and below the dead-center, extending horizontally from the pivoted points of the ends of the braces that are attached to the sides A. When the jointed and folded braces are thus placed and engaged by the clasps, they serve as locking devices to retain the gate firmly fixed against the ends of the sides A of the box, as required to maintain tight joints.

To unlock and adjust the gate to be used as a shoveling-board, I simply lift the doubled braces out of the clasps and then turn the gate rearward and downward into a horizontal position and on a level with the floor of the box.

I claim as my invention—

1. The locking device and support for a wagon end-gate, consisting of the jointed and pivoted braces k, and the spring-clasps n, in combination with a wagon-box and an end-gate, substantially as shown and described, to operate in the manner stated.

2. An end-gate for wagon-boxes, having triangular shaped skirt-pieces fixed to its ends and lower portion to project inward to overlap the sides of a wagon-box, and projections at the free corners of said pieces, jointed braces pivoted to the top portion and ends of the gate and also to the outside faces and top corner portions of the sides of a box, stops fixed to the outside faces of the sides of the box to engage the projections on the ends of skirt-pieces fixed to the ends of the gate, and clasps fixed to the same sides to engage the jointed braces, to operate in the manner set forth, for the purposes specified.

3. A wagon-box having side-boards A, and a fixed cleat, B, stops h, and clasps n, fixed to the said side-boards, and end-gate C, having fixed cleats d, and fixed skirt-pieces f g, and jointed braces k, pivoted to the sides of the box and the ends of the gate, constructed, arranged, and combined to operate in the manner set forth, for the purposes stated.

HARRISON W. GARY.

Witnesses:
FRED L. TEMPLE,
GEORGE W. HEWITT.